April 29, 1941.  J. MUROS  2,240,264
SHAVING IMPLEMENT
Filed Dec. 31, 1936
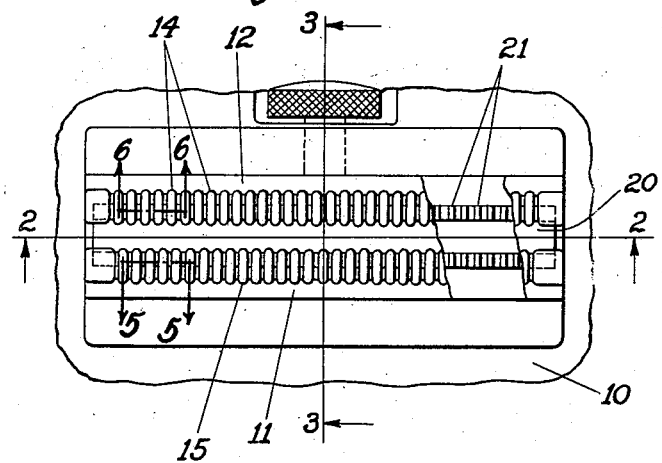
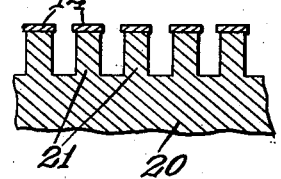
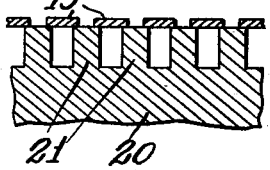
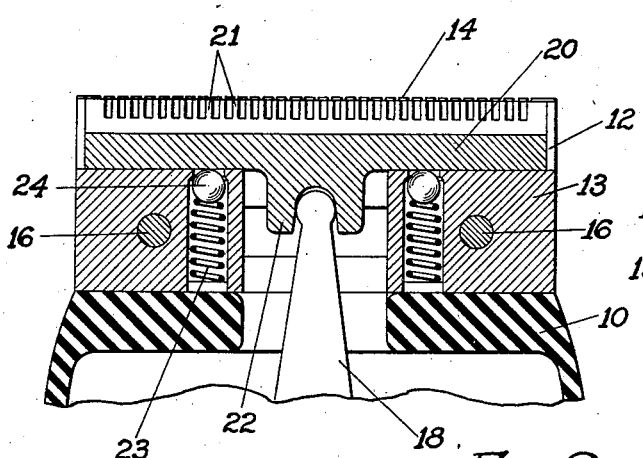
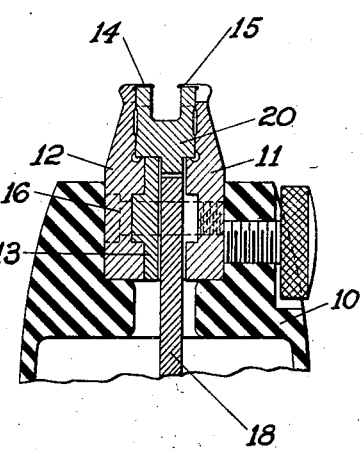
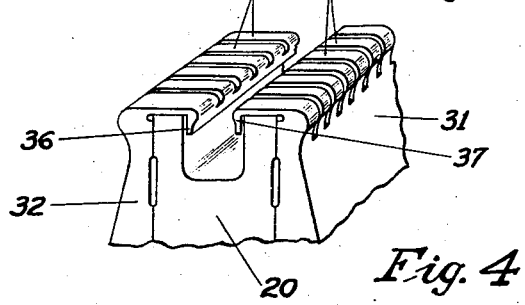
INVENTOR
BY *Joseph Muros.*
*J. M. T. Kenway.*
ATTORNEY Patented Apr. 29, 1941

2,240,264

UNITED STATES PATENT OFFICE 2,240,264

SHAVING IMPLEMENT

Joseph Muros, Cambridge, Mass., assignor to Gillette Safety Razor Company, Boston, Mass., a corporation of Delaware Application December 31, 1936, Serial No. 118,610

5 Claims. (Cl. 30—43)

This invention relates to implements employing co-operating shearing members for shaving without the use of lather. The general object of the invention is to improve implements of this class in respect to closeness of shaving and open time, that is, to increase the portion of the cycle during which the hairs may reach positions between the shearing members.

The thickness of the guard teeth gauges the length of stubble left on the face of the user and, accordingly, an important feature of my invention resides in a structure which permits the use of very short and consequently very thin guard teeth. As herein shown the guard teeth are arranged in two inwardly directed series spaced from each other by an appreciable opening between the ends of the teeth. Co-operating with the guard is a cutter which presents a series of shearing teeth located beneath the stationary teeth of the guard and separated as a series by substantially equal space. Each guard tooth may, therefore, become a short, stiff, self-sustaining projection and may be reduced to a thickness of .006 inch or thereabouts without tendency to flex. This is partly because the teeth are so well protected, extending inwardly as they do from the solid metal of the guard member, and partly because they bridge no substantial distance in the implement. Optionally the inner edge of the guard teeth may be formed with a supporting or reenforcing flange downwardly extending and located in the channel of the cutter.

The open time of the implement is increased by the following expedient: The stationary teeth of the guard are arranged in opposite and offset series, that is to say the teeth in one series are arranged opposite to the spaces in the other series. The teeth of the movable cutter are formed with the same spacing and center distance as the guard but are not offset, that is, the teeth in one side of the movable cutter are transversely aligned with the corresponding teeth in the other side of the cutter. It follows, therefore, that when one series of teeth in the cutter closes the spaces in one series of teeth in the guard, the other series of teeth in the cutter register with the other series of teeth of the guard and present the slots thereof in wide open position. Consequently, as one series of teeth is closing the other series of teeth is opening and the implement as a whole is never in a condition of having all its teeth closed, a condition which is frequently encountered in implements having a single series of equally spaced guard and cutter teeth.

Another important advantage flows from staggering the teeth of the guard. In the movement of the implement over the face of the user hairs first encountering the teeth in one series subsequently find spaces in the other series and thus reach the shearing zone, whereas if the teeth of both series were arranged in transverse alignment, such hairs would be blocked by the teeth across the full width of the guard. Stated in another way, the staggered arrangement permits reducing by one-half the effective pitch of the shearing teeth of the guard plate as a whole, that is to say, the distance between the centers of adjacent spaces. This makes finer the combing action of the implement and improves its shaving efficiency.

These and other features of my invention will be best understood and appreciated from the following description of two preferred embodiments thereof selected for purposes of illustration and shown in the accompanying drawing, of which—

Fig. 1 is an end view of the implement on an enlarged scale, portions being shown as broken away;

Fig. 2 is a similar view in longitudinal section;

Fig. 3 is a view in cross-section on the line 3—3 of Fig. 2;

Fig. 4 is a view in perspective of portions of an implement of modified construction;

Figs. 5 and 6 are respectively views in longitudinal section on the lines 5—5 and 6—6 of Fig. 1.

The implement includes in its structure a casing 10 of molded material, such as "Bakelite," shaped to serve as a handle and also as a housing for a small motor, not shown. The casing 10 is formed at its upper end with spaced flanges to receive the metallic head of the implement. This comprises a pair of similar side members 11 and 12 rectangular in contour, tapering inwardly and upwardly to a flanged top face or land and provided upon their inner faces with oppositely arranged longitudinal grooves. The two side members 11 and 12 constitute the guard of the razor and are maintained rigidly in spaced relation by a spacer piece 13 having outwardly projecting ribs on its opposite sides which fit in the grooves of the side members 11 and 12. The spacer piece 13 is cut away centrally on one side as shown in Fig. 2 and extends at its ends into flush relation with the ends of the side members 11 and 12. These three members of the implement are assembled and maintained rigidly in assembled relation by transverse screws 16 shouldered in the member 12 and threaded into the member 11.

The upper part of the two side members 11 and 12 include shallow inwardly directed flanges. These flanges and the upper portions of the side members are slotted to present series of spaced teeth 14 and 15 respectively. The teeth 14 are formed in the lands of the side member 12 with equal spacing, each tooth being defined by adjacent transverse slots and presenting shearing edges upon its lower face. The teeth 15 are formed in the side member 11 by similar slots and also with equal spacing but are staggered in respect to the teeth 14, that is to say, each tooth 15 is located opposite to a space or slot in the land of the side member 12, while each tooth 14 is located opposite a space or slot in the land of the side member 11. It will be apparent from Figs. 2 and 3 that the slots forming these teeth 14 and 15 extend downwardly for an appreciable distance into the body of the respective side members. The flat upper surfaces of the teeth extend transversely for an appreciable distance and thus the slots act as guides for directing to the shearing zone hairs entering from either side of the teeth. On this account the hairs to be sheared may enter freely into the slots either from an external position or from an internal position between the inner ends of the two series of teeth. It follows that a hair which is located improperly to enter a space in the series of teeth 15 will naturally register and enter a space between the series of teeth 14, assuming that the razor is moved in a transverse direction across the face of the user.

The teeth 14 and 15, which are guard teeth as well as shearing elements, are self-supporting and do not require external support of any kind against breaking or flexing. The reason for this is that they overhang an extremely short distance, about 3/64 inch in practice, and, while their thickness is only .006 inch, these dimensions render them strong and stiff. The overhang is so short that the teeth would break off rather than flex, and they are well protected in use against abuse that might lead to breakage because of the fact that they project inwardly from the solid body of the side pieces.

Arranged in co-operating shearing relation with the teeth 14 and 15 of the outer or guard member is a reciprocatory cutter bar 20 having in its upper surface a pair of spaced upstanding flanges surfaced to fit beneath the slotted flanges of the guard member and being themselves slotted to present two series of oppositely arranged spaced flat-top shearing teeth 21 separated by a channel of rectangular cross section. The spacing of the teeth 21 corresponds to the spacing of the teeth 14 and 15 of the guard member but the teeth themselves are of slightly less width so that in one position, viz., that shown in Fig. 2, each tooth 21 is masked beneath a tooth 14 of the rearmost series of guard teeth. On the other hand, the teeth of the two series in the cutter are matched instead of offset, as in the guard, that is, the teeth of the two series are transversely aligned. It follows, therefore that when the teeth 21 of one side of the cutter register with the teeth 14 of the rearmost series, the teeth 21 of the other flange of the cutter bar will register with the spaces between the teeth 15 of the foremost series of the guard member, as shown in Figs. 5 and 6. This arrangement insures that the spaces between one series or other of the teeth of the implement shall be opened at all times for the reception of the hairs encountered in moving the implement transversely on the face of the user and also distributes the load on the implement by causing the cutting phase of the two series of teeth to occur at different points in the cycle.

The shearing teeth of the cutter bar 20 are at all times maintained yieldingly in engagement with the shearing teeth of the guard member by a pair of compression springs 23 which are received in sockets provided for that purpose in the spacer piece 13 and which bear upon the under surface of the cutter bar 20 through the medium of hardened balls 24. Thus, the teeth 14 and 15 of the guard are not only self-sustaining but they resist the pressure of the cutter bar.

Reciprocation of the proper amplitude is imparted to the cutter bar by means of an oscillatory lever 18 which is connected to the motor, not shown. For connection with the upper rounded end of this lever the cutter bar 20 is provided with a forked downwardly extending lug 22.

In operation, the lever 14 is oscillated at high speed through its connection with the motor and the cutter bar 20 is reciprocated so that its teeth 21 shear first on one side and then on the other of the teeth 14 or the teeth 15 of the guard member. The implement is meanwhile moved in end contact across the face of the user always picking up hairs at the advance edge of the two spaced series of guard teeth 14 and 15 depending upon which direction the implement is moved and, as already explained, those hairs which are missed by the advancing edge of the series 15, on account of the staggered relation of the teeth, will be picked up and guided into shearing position by the advancing edge of the series of teeth 14.

A slightly modified construction is shown in Fig. 4 in that the tooth-carrying portions of the side members 31 and 32 are extended into downwardly extending flanges 36 and 37. These flanges connect the outer ends of the teeth 34 and 35, which are arranged in offset series as before, and constitute a brace or support for each land tending effectively to stiffen and support it. In this instance each slot opens through the supporting flange and affords a continuous passage through which hairs may pass to reach the shearing zone; that is the hairs may pass into the slots in either direction to reach the shearing zone. The forked portions of the cutter 20 which carry the movable teeth are located in the spaces beneath the lands of the guard which are defined by the flanges 36 and 37.

Having thus disclosed my invention and described two embodiments thereof by way of illustration and not limitation, what I claim as new and desire to secure by Letters Patent is:

1. An implement of the class described including a guard having two separate series of shearing teeth therein, one being offset with respect to the other, and a relatively movable cutter having teeth so related to those of the guard that one series of teeth is always opening when the other series is being closed by the movement of the cutter.

2. An implement of the class described including in its structure a guard having spaced inwardly directed flanges slotted to present two opposed series of shearing teeth spaced from each other at their inner ends, one series being offset with respect to the other, and a reciprocatory cutter having two co-operating series of shearing teeth having the same center distance as those of the guard and arranged in transverse alignment.

3. An implement of the class described including in its structure a guard having two oppositely arranged series of shearing teeth staggered transversely with relation to each other, and a reciprocatory cutter member having corresponding teeth arranged in transverse alignment with each other.

4. An implement of the class described including in its structure a guard having opposed, inwardly directed flanges containing shearing teeth staggered transversely with respect to each other, and a reciprocatory cutter member having corresponding teeth arranged in transverse alignment.

5. A shaving implement including in its structure two parallel and longitudinally disposed sets of stationary shearing teeth, and a reciprocatory cutter presenting two parallel and longitudinally disposed sets of movable shearing teeth, the movable teeth of one set being disposed in registration with the corresponding stationary teeth when the movable teeth of the other set register with spaces between the stationary teeth of the other set.

JOSEPH MUROS.